(12) United States Patent
Titsworth et al.

(10) Patent No.: US 12,292,307 B2
(45) Date of Patent: May 6, 2025

(54) ROAD NETWORK MAPPING USING VEHICLE TELEMETRY DATA

(71) Applicant: GM GLOBAL TECHNOLOGY OPERATIONS LLC, Detroit, MI (US)

(72) Inventors: Matthew K Titsworth, Austin, TX (US); Daniel Taylor, Farmington Hills, MI (US); Sean Douglas Vermillion, Austin, TX (US); Elyas Sabeti, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 539 days.

(21) Appl. No.: 17/648,673

(22) Filed: Jan. 22, 2022

(65) Prior Publication Data

US 2023/0236036 A1 Jul. 27, 2023

(51) Int. Cl.
*G01C 21/00* (2006.01)
*G06F 16/29* (2019.01)
*G08G 1/01* (2006.01)

(52) U.S. Cl.
CPC ..... *G01C 21/3841* (2020.08); *G01C 21/3815* (2020.08); *G06F 16/29* (2019.01); *G08G 1/0112* (2013.01); *G08G 1/0129* (2013.01); *G08G 1/0133* (2013.01)

(58) Field of Classification Search
CPC . G01C 21/3841; G01C 21/3815; G06F 16/29; G08G 1/0112; G08G 1/0129; G08G 1/0133
See application file for complete search history.

(56) References Cited

U.S. PATENT DOCUMENTS

| | | | |
|---|---|---|---|
| 2008/0162041 A1* | 7/2008 | Nakamura | G01C 21/3844 701/533 |
| 2016/0335923 A1* | 11/2016 | Hofmann | G01C 21/3819 |
| 2019/0170519 A1* | 6/2019 | Anwar | G01C 21/3841 |
| 2020/0189579 A1* | 6/2020 | Haque | B60W 30/09 |
| 2021/0231458 A1* | 7/2021 | Millington | G01C 21/3815 |
| 2022/0161817 A1* | 5/2022 | Anastassov | G01C 21/3841 |
| 2022/0221281 A1* | 7/2022 | Millington | G08G 1/0112 |
| 2023/0130814 A1* | 4/2023 | Nister | G06N 3/045 701/23 |

* cited by examiner

*Primary Examiner* — Justin R. Blaufeld
(74) *Attorney, Agent, or Firm* — Lorenz & Kopf LLP (57) ABSTRACT

In exemplary embodiments, methods and systems are provided that include: obtaining, via telematics systems of a plurality of vehicles, vehicle telemetry data as the plurality of vehicles travel through one or more geographic regions; transforming, from a computer processor, the vehicle telemetry data into a geohash encoded format pertaining to the one or more geographic regions; identifying, via a processor, a plurality of road junctions using the vehicle telemetry data that is transformed into a geohashed encoding; identifying, via the processor, a plurality of road segments using the vehicle telemetry data that is transformed into a geohashed encoding for the one or more geographic regions; and generating, via the processor, a road network mapping for the one or more geographic regions that includes the plurality of road junctions and the plurality of road segments utilizing the vehicle telemetry data that is transformed into a geohashed encoding.

15 Claims, 9 Drawing Sheets

ROAD NETWORK MAPPING USING VEHICLE TELEMETRY DATA

TECHNICAL FIELD

The technical field generally relates to vehicles, and more particularly relates to methods and systems for identifying road networks using telemetry data from the vehicles.

Certain vehicles today have telematics units that utilize vehicle telemetry data. However, such vehicles may not always provide for optimal use of the vehicle telemetry data.

Accordingly, it may be desirable to provide improved methods and systems for utilizing vehicle telemetry data. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: obtaining, via telematics systems of a plurality of vehicles, vehicle telemetry data as the plurality of vehicles travel through one or more geographic regions; transforming, from a computer processor, the vehicle telemetry data into a geohash encoded format pertaining to the one or more geographic regions; identifying, via a processor, a plurality of road junctions using the vehicle telemetry data that is transformed into a geohashed encoding; identifying, via the processor, a plurality of road segments using the vehicle telemetry data that is transformed into a geohashed encoding for the one or more geographic regions; and generating, via the processor, a road network mapping for the one or more geographic regions that includes the plurality of road junctions and the plurality of road segments utilizing the vehicle telemetry data that is transformed into a geohashed encoding.

Also in an exemplary embodiment, the obtaining of the vehicle telemetry data includes obtaining the vehicle telemetry data that includes a vehicle position, a vehicle heading, and a vehicle speed for each of the plurality of vehicles; and the steps of identifying the plurality of road segments and identifying, via the processor, the plurality of road junctions include identifying the plurality of road segments and identifying the plurality of road junctions, respectively, using the vehicle telemetry data that is transformed into a geohashed encoding.

Also in an exemplary embodiment, the method further includes: identifying, via the processor, pairs of sequential telemetry data points of the vehicle telemetry data in which a change in heading is greater than a predetermined threshold, indicating a vehicle turn; and determining, via the processor, cornering points for each pair of sequential telemetry points; wherein the steps of identifying the plurality of road segments and identifying the plurality of road junctions include identifying, via the processor, the plurality of road segments and identifying the plurality of road junctions, respectively, using the cornering points.

Also in an exemplary embodiment, the step of determining the corning points includes determining, via the processor, the cornering points for each pair of sequential telemetry points based on a linear interpolation between the sequential telemetry points of the pair; and wherein the steps of identifying the plurality of road segments and identifying the plurality of road junctions include identifying, via the processor, the plurality of road segments and identifying the plurality of road junctions, respectively, based on a clustering of the cornering points of the plurality of vehicles over a plurality of periods of time as the plurality of vehicles travel through the one or more geographic regions.

Also in an exemplary embodiment, the method further includes classifying the plurality of road junctions, via the processor, based on the clustering of the cornering points, into the following classifications of road junctions: intersections, residential driveways, U-turns, parking lot, business driveways, and curved roads.

Also in an exemplary embodiment, the step of identifying the plurality of road segments includes: removing, via the processor, geohashes for the plurality of road junctions; clustering, via the processor, remaining geohashes into segment fragments; merging via the processor, segment fragments together based on geographic proximity; splitting, via the processor, disconnected segment fragments apart; and adding, via the processor, directions to each respective geohash.

Also in an exemplary embodiment, the method further includes stitching, via the processor, respective road network mappings for a plurality of the one or more geographic regions, based on identified boundaries and adjacencies for the respective road mappings, thereby generating the road network mapping for the plurality of the one or more geographic regions.

Also in an exemplary embodiment, the method further includes obtaining, from the computer memory, a prior network topology for the one or more geographic regions; wherein the step of generating the road network mapping includes generating, via the processor, the road network mapping for the one or more geographic regions that includes the plurality of road junctions and the plurality of road segments, utilizing the vehicle telemetry data that is transformed into a geohashed encoding, and the prior network topology.

Also in an exemplary embodiment, the method further includes updating the prior network topology, via the processor, via one or more road segments, road junctions, or both that are identified in the road network mapping in a manner that is different from prior network topology.

Also in an exemplary embodiment, the method further includes defining, via the processor, geohash resolutions with respect to the one or more geographic regions of interest, wherein the defining of the geohash resolutions includes defining, via the processor, both a coarse resolution and a fine resolution, wherein the coarse resolution provides decomposing of the road network mapping into a parallelizable process, and wherein the fine resolution provides discrete units that are used to describe road segments and junctions in the road network mapping.

In another exemplary embodiment, a system is provided that includes telematics systems from a plurality of vehicles and a processor. The processor is configured to at least facilitate: obtaining, from telematics systems of the plurality of vehicles, vehicle telemetry data as the plurality of vehicles travel through one or more geographic regions; transforming the vehicle telemetry into a geohashed encoding; identifying a plurality of road junctions using the vehicle telemetry data that has been transformed into a geohashed encoding for the one or more geographic regions; identifying a plurality of road segments using the vehicle telemetry data that has been transformed into a geohashed encoding for the one or more geographic regions; and generating a road network mapping for the one or more geographic regions that includes the plurality of road junctions and the plurality of road segments utilizing the vehicle telemetry data that has been transformed into a geohashed encoding.

Also in an exemplary embodiment, the processor is configured to at least facilitate: obtaining the vehicle telemetry data that includes a vehicle position, a vehicle heading, and a vehicle speed for each of the plurality of vehicles; and identifying the plurality of road segments and identifying the plurality of road junctions, respectively, using the vehicle telemetry data that has been transformed into a geohashed encoding for the one or more geographic regions.

Also in an exemplary embodiment, the processor is configured to at least facilitate: identifying pairs of sequential telemetry data points of the vehicle telemetry data in which a change in heading is greater than a predetermined threshold, indicating a vehicle turn; determining cornering points for each pair of sequential telemetry points; and identifying the plurality of road segments and identifying the plurality of road junctions, respectively, using the cornering points.

Also in an exemplary embodiment, the processor is configured to at least facilitate: determining the cornering points for each pair of sequential telemetry points based on a linear interpolation between the sequential telemetry points of the pair; and identifying the plurality of road segments and identifying the plurality of road junctions, respectively, based on a clustering of the cornering points of the plurality of vehicles over a plurality of periods of time as the plurality of vehicles travel through the one or more geographic regions.

Also in an exemplary embodiment, the processor is configured to at least facilitate classifying the plurality of road junctions, based on the clustering of turning movements into the following classifications of road junctions: intersections, residential driveways, U-turns, parking lot, business driveways, and curved roads.

Also in an exemplary embodiment, the processor is configured to at least facilitate: removing geohashes for the plurality of road junctions; clustering remaining geohashes into segment fragments; merging segment fragments together based on geographic proximity; splitting disconnected segment fragments apart; and adding directions to each respective geohash.

Also in an exemplary embodiment, the processor is configured to at least facilitate stitching respective road network mappings for a plurality of the one or more geographic regions, based on identified boundaries and adjacencies for the respective road network mappings, thereby generating the road network mapping for the plurality of the one or more geographic regions.

Also in an exemplary embodiment, the processor is configured to at least facilitate: obtaining, from the non-transitory computer readable storage medium, a prior network topology for the one or more geographic regions; generating the road network mapping for the one or more geographic regions that includes the plurality of road junctions and the plurality of road segments, utilizing the vehicle telemetry data that has been transformed into a geohashed encoding, and the prior network topology; and updating the prior network topology via one or more road segments, road junctions, or both that are identified in the road network mapping in a manner that is different from prior network topology.

Also in an exemplary embodiment, the processor is further configured to at least facilitate defining geohash resolutions with respect to the one or more geographic regions of interest into both a coarse resolution and a fine resolution, wherein the coarse resolution provides decomposing of the road network mapping into a parallelizable process, and wherein the fine resolution provides discrete units that are used to describe road segments and junctions in the road network mapping.

In another exemplary embodiment, a system is provided that includes a plurality of vehicles and a remote server. Each of the plurality of vehicles have respective telematics systems. The remote server that is communicatively coupled to the plurality of vehicles. The remote server includes a processor that is coupled to the telematics systems of the plurality of vehicles, and that is configured to at least facilitate: obtaining, from telematics systems of the plurality of vehicles, vehicle telemetry data as the plurality of vehicles travel through the one or more geographic regions; transforming, from the computer processor, the vehicle telemetry data into a geohash encoded format pertaining to the one or more geographic regions; identifying a plurality of road junctions using the vehicle telemetry data that has been transformed into a geohashed encoding for the one or more geographic regions; identifying a plurality of road segments using the vehicle telemetry data that has been transformed into a geohashed encoding for the one or more geographic regions; and generating a road network mapping for the one or more geographic regions that includes the plurality of road junctions and the plurality of road segments utilizing the vehicle telemetry data that has been transformed into a geohashed encoding.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
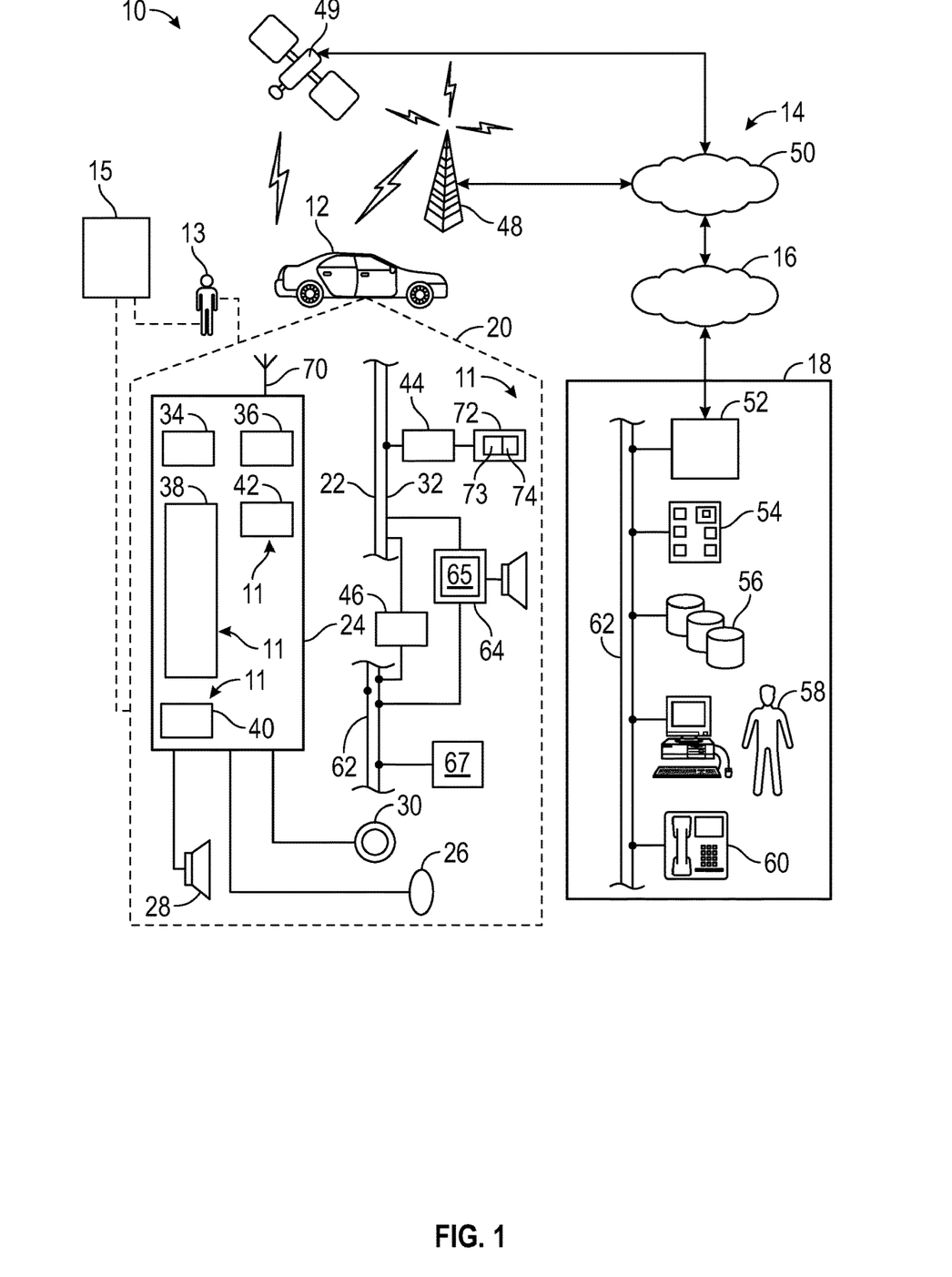
FIG. 1 is a functional block diagram of a communications system that includes a vehicle having a telematics unit and a control system that is configured to discover and map road networks using vehicle telemetry data that is transformed to a geohash encoding, in accordance with exemplary embodiments.

FIG. 1 is a functional block diagram of a communications system 10, in accordance with an exemplary embodiment. As described in greater detail further below, the communications system 10 includes one or more vehicles 12. While a single vehicle 12 is depicted in FIG. 1, it will be appreciated that in various embodiments the communications system 10 may include a number of different vehicles 12. In various embodiments, the communication system 10 (and the process 200 described further below in connection with FIGS. 2-10) include many different vehicles 12 for which vehicle telemetry data is obtained at various different points in time (e.g., including the past, present, and future). Also in various embodiments, when the "vehicle 12" is discussed herein, it will be appreciated that similar discussions would apply to each of the vehicles 12 in the communications system 10 (e.g., each of the vehicles 12 for which vehicle telemetry data is obtained, including the past, present, and future).

In various embodiments, the communications system 10 discovers and maps road networks using vehicle telemetry data from the vehicles 12 that is transformed to a geohash encoding, in accordance with the steps of the process 200 described further below in connection with FIGS. 2-10.

As depicted in FIG. 1, in various embodiments, each vehicle 12 includes a telematics unit 24 and a control system 11 that is configured to discover and map road networks using vehicle telemetry data from the telematics unit 24 that is transformed to a geohash encoding, in accordance with exemplary embodiments. As described further below in connection with FIG. 1, the control system 11 includes a processor 38, computer memory 40, a satellite-based location determining system component (e.g., GPS system) 42, an antenna 70, and vehicle sensors 72 that include one or more ignition sensors 73 and antenna sensors 74, described further below.

As depicted in FIG. 1, in certain embodiments, the communications system 10, the communications system 10 also includes and/or is used in connection with an electronic device 15 (e.g., a smart phone, computer, and/or other electronic device) of a user 13 (e.g., a driver or other occupant) of the vehicle 12.

Also as depicted in FIG. 1, the communications system 10 generally includes a plurality of vehicles 12 (e.g., similar to the vehicle 12 depicted in FIG. 1), along with one or more wireless carrier systems 14, one or more land networks 16, and one or more remote servers 18. It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, the vehicle 12 may be any type of mobile vehicle such as an automobile, car, motorcycle, truck, recreational vehicle (RV), boat or other watercraft, plane or other aircraft, spacecraft, farm equipment, or the like, and/or any number of other vehicles and/or other types of mobile platforms, and is equipped with suitable hardware and software that enables it to communicate over communications system 10. As shown in FIG. 1, in various embodiments the vehicle hardware 20 is disposed within a body of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS system 42. In one example, the wireless modem 36 includes a computer program and/or set of software routines adapted to be executed within electronic processing device 38.

In various embodiments, the processor 38 controls operation of the telematics unit 24 and of the vehicle 12. In certain embodiments, the processor 38 at least facilitates discovery and mapping of road networks using vehicle telemetry data from the telematics unit 24 that is transformed to a geohash encoding (e.g., in certain embodiments, the processor 38 may assist one or more processors of one or more servers/processors 54 of the remote server 18 of FIG. 1 with such functionality). In certain embodiments, the processor 38 performs these functions in accordance with the steps of the process 200 that is depicted in FIGS. 2-10 and that is described further below in connection therewith.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS system 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services. In various embodiments, the telematics unit 24 provides vehicle telemetry data for use, that is transformed to a geohash encoding, in discovering and mapping road networks on which the vehicle 12 may travel.

In various embodiments, the telematics unit 24 may also provide services, for example for communication with one or more electronic devices 15 as well as with the remote server 18. For example, in certain embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS system 42; emergency assistance services, information requests from the users of the vehicle 12, and/or infotainment-related services, for example content is downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the user 13 of the vehicle 12. In various embodiments, the display components 67 provides a visual display for the user 13 as to relevant information pertaining to the cellular communications, as well as, in various embodiments, navigation information, camera images and video, and so on.

Vehicle sensors 72, connected to various sensor interface modules 44 are operatively connected to the vehicle bus 32.

In various embodiments, the vehicle sensors 72 include both ignition sensors 73 and telemetry sensors 74. In various embodiments, one or more ignition sensors 73 detect when an ignition cycle or vehicle drive is beginning or is about to begin. For example, in various embodiments, the ignition sensors 73 detect when the vehicle 12 (e.g., an engine thereof) is starting, and/or when the user 13 has entered the vehicle 12, unlocked the vehicle 12, provided an instruction (e.g., an input device and/or keyfob) to start the vehicle 12, or the like. Also in various embodiments, the telemetry sensors 74 communicate with a location detection system via signals thereof (e.g., with satellites of a GPS system), for example via the GPS system 42 via the antenna 70.

In addition, in various embodiments, the vehicle sensors 72 may also include any number of additional sensors including, by way of example, gyroscopes, accelerometers, magnetometers, emission detection, and/or control sensors, and the like. Also in various embodiments, exemplary sensor interface modules 44 include powertrain control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX)

switch, routes incoming signals so that voice transmissions are usually sent to either advisor 58 or an automated response system, and data transmissions are passed on to a modem or other piece of telecommunication/computer equipment 60 for demodulation and further signal processing.

In various embodiments, the one or more servers 54 comprise one or more processors that are configured to discover and map road networks using vehicle telemetry data from the telematics unit 24 of the vehicles 12 that is transformed to a geohash encoding. In various embodiments, the one or more servers 54 (including one or more computer processors thereof) perform these functions in accordance with the steps of the process 200 described further below in connection with FIGS. 2-10.

The modem or other telecommunication/computer equipment 60 may include an encoder, as previously explained, and can be connected to various devices such as a server 54 and database 56. For example, the database 56 may store regulatory radiated power requirements for various jurisdictions, as noted above. Moreover, in certain embodiments, the database 56 could also be designed to store other types of data, such as by way of example, subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile or fixed.

In various embodiments a large number of vehicles 12 (e.g., including each vehicle 12 for which vehicle telemetry data is obtained, in the past, present, and future) may be utilized along with the remote server 18 and the communications networks depicted herein for discovering and mapping the road network using the vehicle telemetry data that is transformed to a geohash encoding for the geographic locations on Earth in which the vehicles 12 are travelling, in accordance with the process 200 described below in connection with FIGS. 2-10.

Figure 2:
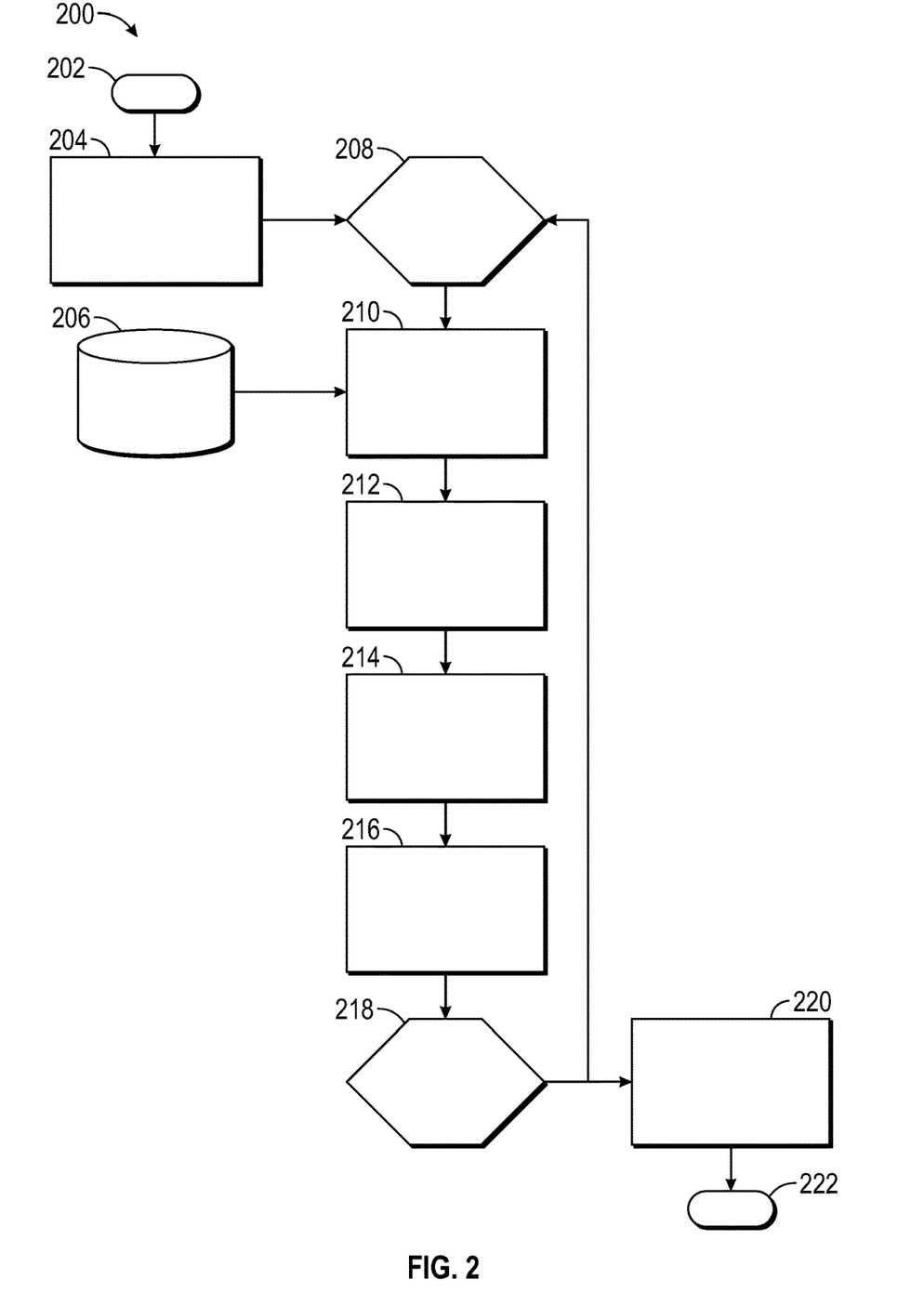
FIG. 2 is a flowchart of a process for discovering and mapping road networks using vehicle telemetry data that is transformed to a geohash encoding and that can be used in connection with the communications system of FIG. 1, including the vehicle, telematics unit, and control unit thereof, and components thereof, in accordance with exemplary embodiments.

FIG. 2 is a flowchart of a process 200 for discovering road networks using vehicle telemetry data that is transformed to a geohash encoding, in accordance with exemplary embodiments. In various embodiments, the process 200 can be used in connection with the communications system 10 of FIG. 1, including the vehicle 12 and the control system 11, telematics unit 24, GPS system 42, and the remote server 18 and processor 54 and databases 56 thereof, as well as components thereof, in accordance with exemplary embodiments. The process 200 will be described further below in connection with FIG. 2 as well as in connection with FIGS. 3-7 (which describe different steps of the process 200 in accordance with exemplary embodiment) and FIGS. 8-10 (which provide graphical representations of exemplary implementations of the process 200 and the steps thereof in accordance with exemplary embodiments).

In various embodiments, the process 200 begins at step 202. In one embodiment, the process 200 begins when a vehicle drive or ignition cycle begins, for example when a driver approaches or enters the vehicle 12, or when the driver turns on the vehicle and/or an ignition therefor (e.g. by turning a key, engaging a keyfob or start button, and so on), and/or is otherwise operating the vehicle 12. In one embodiment, the steps of the process 200 are performed with the aggregate data with a number of vehicles 12 at various different points in time.

In various embodiments, geohash resolutions are defined (step 204). In various embodiments, coarse and fine geohash resolutions are defined with respect to one or more geographic regions of interest with respect to the proximity of the vehicle 12 at some past time. In various embodiments, the coarse and fine geohash units are retrieved from one or more computer memory devices 40 and/or databases 56 of FIG. 1. In various embodiments, the geohash resolutions refer to multiple geohash resolutions by which the Earth's surface is discretized, including (i) a coarse resolution; and (ii) a fine resolution. In various embodiments, the coarse resolution affords decomposing the road network into a parallelizable process, whereas the fine resolution provides discrete units that are used to describe road segments and junctions, as described in greater detail further below.

In various embodiments, the coarse geohashes are partitioned to be processed in parallel (step 208). Specifically, in various embodiments, a processor (such as one or more processors 54 of the remote server 18 of FIG. 1 and/or one or more other processors that are physically remote from the vehicles) selects the telemetry data pertaining to a specific geographic region corresponding to the coarse geohash.

In various embodiments, for each coarse geohash, telemetry data is gathered (step 210). In various embodiments, during step 210, telemetry data 206 is gathered from the vehicle 12 pertaining to the partition represented by each coarse geohash. In various embodiments, the telemetry data 206 includes various signals (or "pings") from the vehicle with respect to the telemetry sensors 74 and the GPS system 42 of FIG. 1. Also in various embodiments, the Telemetry data 206 represents a geographic location of the vehicle 12 along with information as to a velocity and directional heading of the vehicle 12. In various embodiments, the telemetry data (e.g., Telemetry data) is gathered for each of the vehicles 12 (e.g., in the fleet of vehicle 12) for each coarse geohash (e.g., for each geographic partition).

Figure 8:
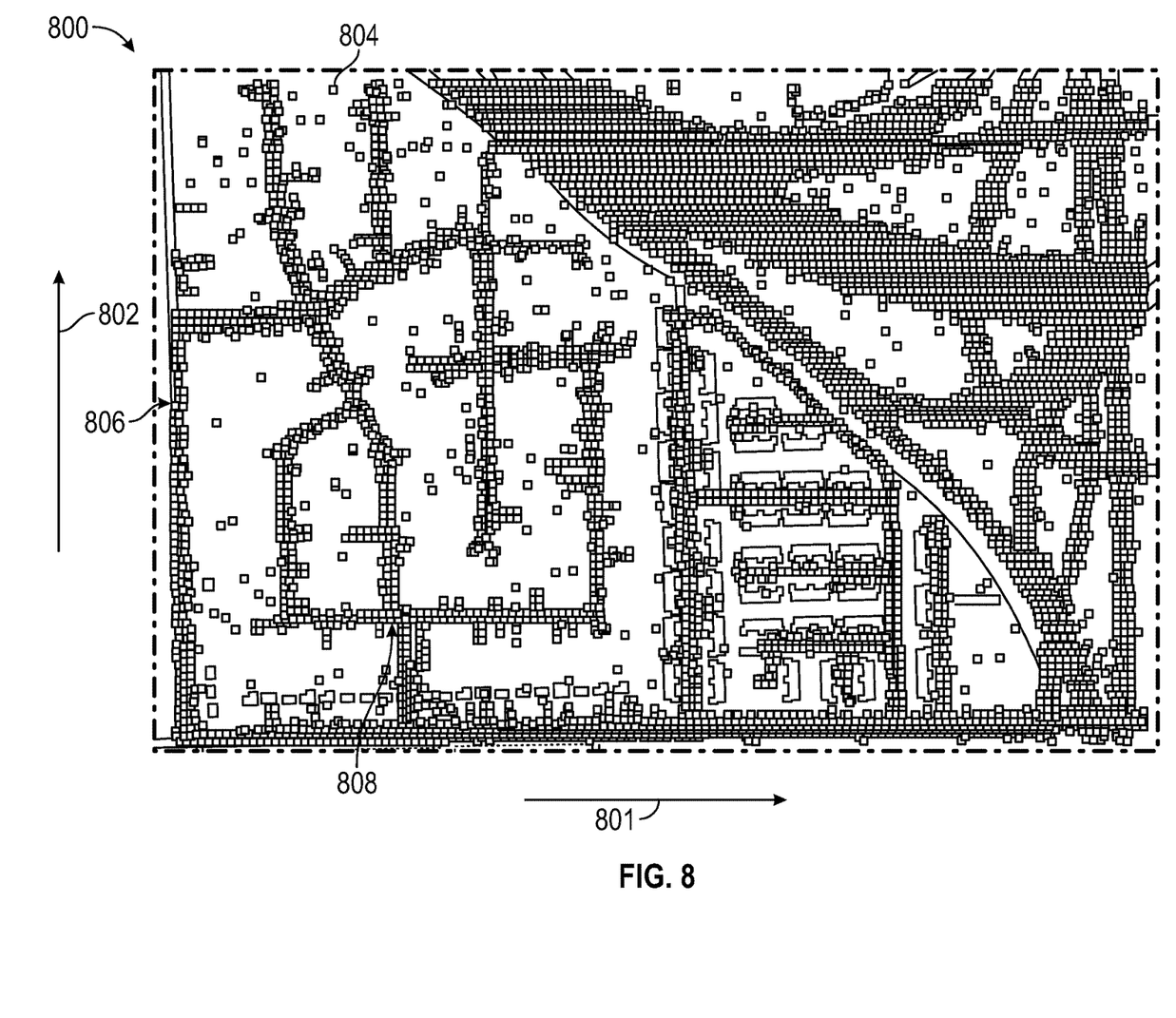
FIGS. 8-10 are graphical representations of exemplary implementations of the process of FIG. 2 and the steps of FIGS. 2-7, in accordance with exemplary embodiments.

With reference to FIG. 8, a graphical representation 800 of the telemetry data is provided, having an x-axis 801 representing longitude and a y-axis 802 representing latitude. In various embodiments, each signal (or "ping") of the HSVT telemetry data is represented by a different point 804 in the graphical representation 800 of FIG. 8.

In various embodiments, every telemetry point is mapped to its corresponding geohash at the resolution for fine geohashes defined in 204. In various embodiments, the observable output of the entire process 200 comprises the collection of fine geohashes identified as belonging to road segments over the entire process 200 (e.g., using each of the vehicles under various different points in time during different vehicle ignition cycles, and so on).

With reference back to FIG. 2, in various embodiments junctions are identified (step 212). In various embodiments, the junctions (e.g., intersections) of the road network are identified by one or more processors (such as one or more processors 54, 38 of FIG. 1) based on the telemetry data of step 210 and are encoded with respective geohash data.

Figure 3:
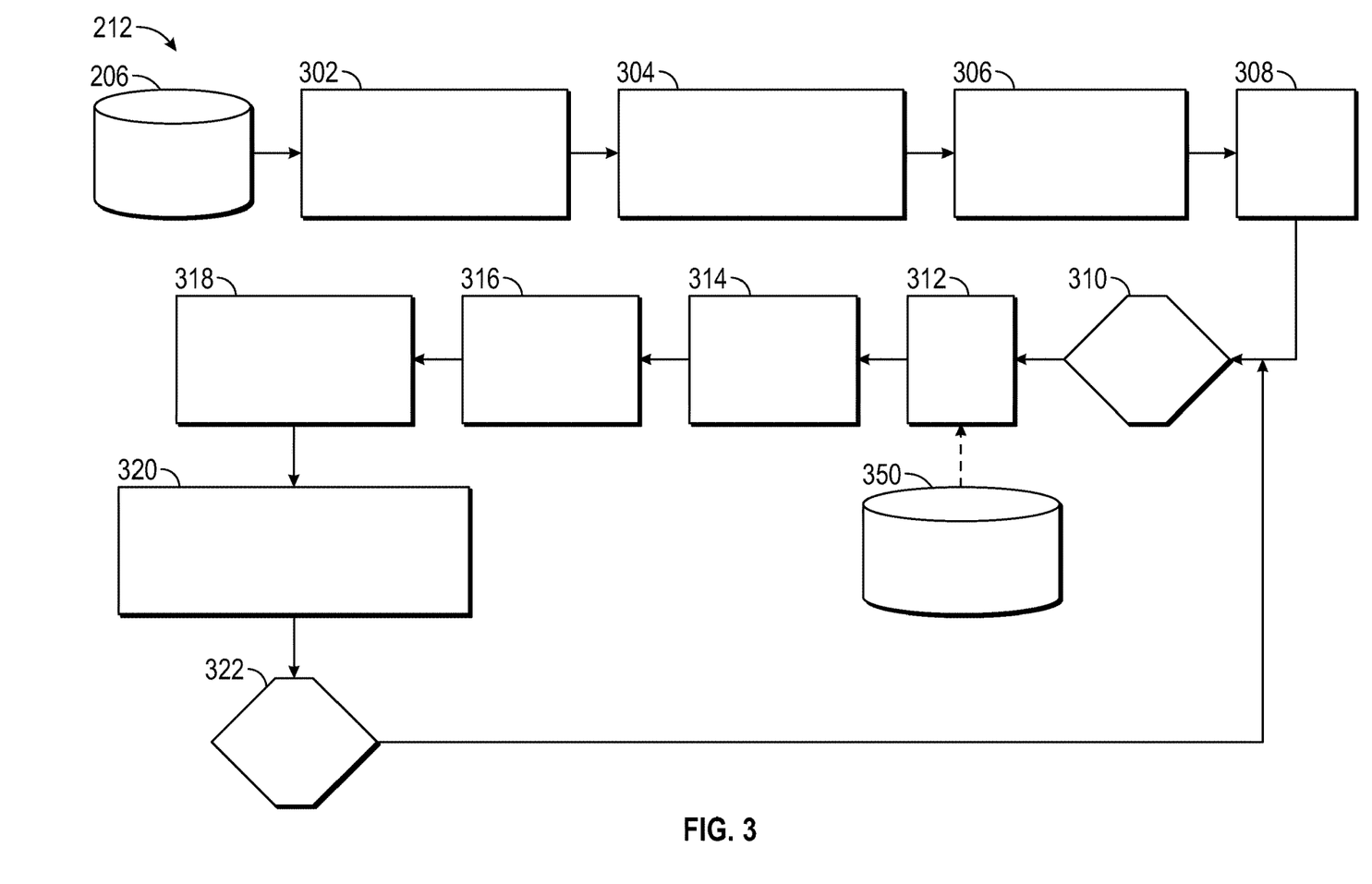
FIG. 3 is a flowchart for a step of the process of FIG. 2, namely, identifying junctions of the road networks, in accordance with exemplary embodiments.

With reference to FIG. 3, an illustrative flowchart is provided for the step of identifying the junctions of step 212 of FIG. 2. As shown in FIG. 3, in various embodiments, the Telemetry data 206 is used to compute heading angle changes between sequential telemetry points (step 302). Specifically, in various embodiments, one or more processors (such as one or more processors 54, 38 of FIG. 1) calculate changes in the heading angle of the vehicle 12 between sequential telemetry signals (or "pings"), such as the points 804 of the graphical representation of FIG. 8.

Also in various embodiments, the telemetry points are paired (step 304). In various embodiments, one or more processors (such as one or more processors 54, 38 of FIG.

1) find telemetry point pairs having heading angle changes that are within a predetermined range. In certain embodiments, such telemetry point pairs are identified based on whether heading angle changes are greater than a predetermined threshold (e.g., ninety degrees in one embodiment, although this may vary in other embodiments), such as to indicate a vehicle turn.

In addition, in various embodiments, "cornering points" are computed between the sequential telemetry points (step 306). In various embodiments, one or more processors (such as one or more processors 54, 38 of FIG. 1) determine the "cornering point" to be a middle point between the sequential telemetry points. In certain embodiments, the "cornering point" is determined via linear interpolation between the sequential telemetry points.

In various embodiments, the cornering points are clustered together (step 308). In various embodiments, cornering points near a particular geographic location are clustered together by one or more processors (such as one or more processors 54, 38 of FIG. 1).

In various embodiments, each cluster is selected one at a time for analysis (step 310). Also in various embodiments, for each cluster, a junction is classified with respect to the particular cluster (step 312). In various embodiments, the junctions are classified via one or more processors (such as one or more processors 54, 38 of FIG. 1). In certain embodiments, prior network topology 350 is also utilized in the junction classification.

Figure 4:
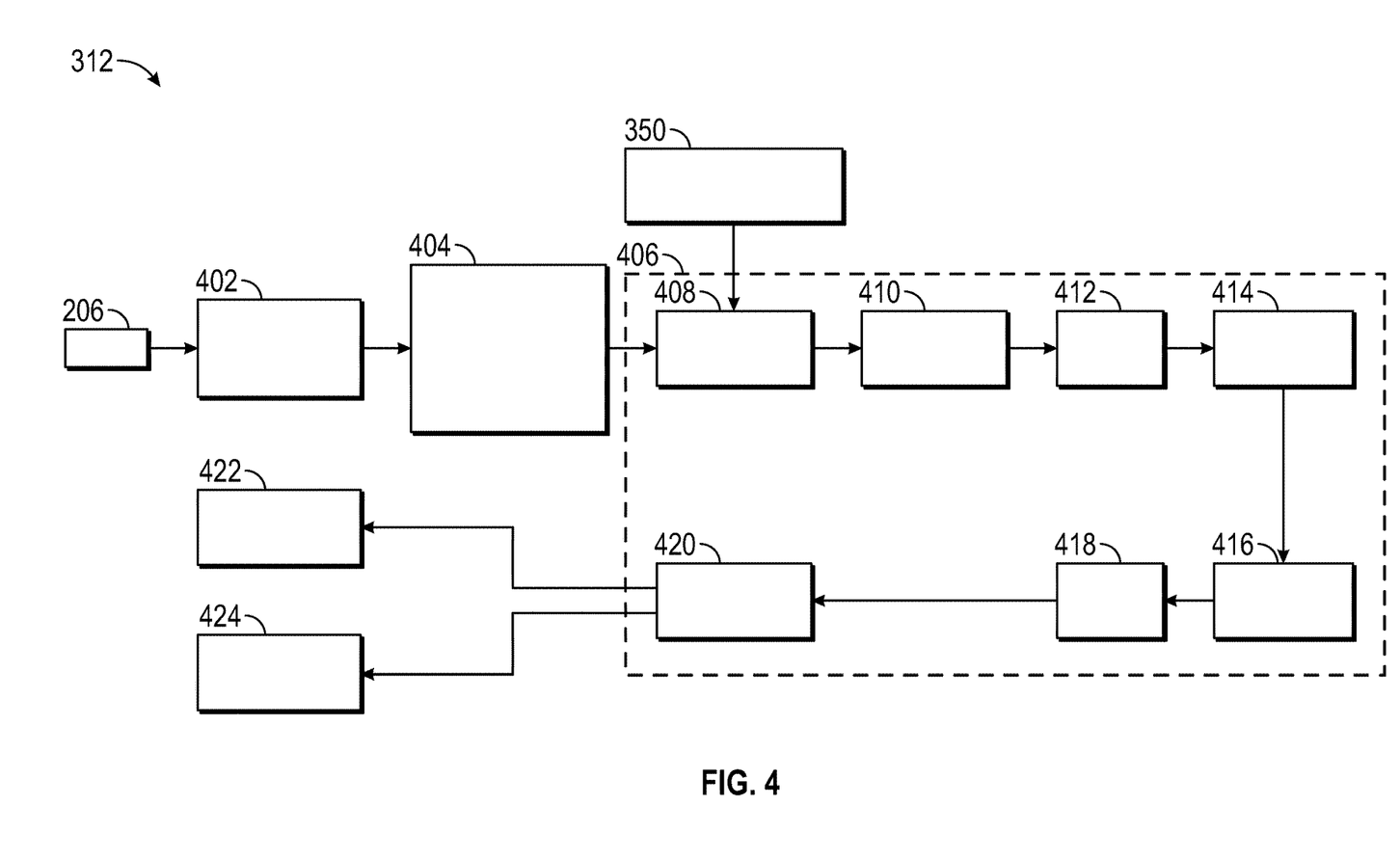
FIG. 4 is a flowchart for a step of the process of FIG. 2, namely, classifying junctions of the road networks, in accordance with exemplary embodiments.

With reference to FIG. 4, an illustrative flowchart is provided for the step of classifying the junctions of step 312 of FIG. 3. As shown in FIG. 4, in various embodiments, the Telemetry data 206 is used to detect turning movements (step 402). Specifically, in various embodiments, one or more processors (such as one or more processors 54, 38 of FIG. 1) detect turning movements of the vehicles 12 based on the changes in direction and/or heading in sequential points of the telemetry data, such as the points 804 of the graphical representation of FIG. 8.

Also in various embodiments, clustering is performed (step 404). In various embodiments, one or more processors (such as one or more processors 54, 38 of FIG. 1) cluster points representing turning movement of the vehicles 12 as well optimize parameters used in the clustering. In various embodiments, the clustering of turning movements 404 is augmented by an optimization of the parameters used for clustering. Also in various embodiments, the purpose of this hyperparameter optimization is to optimize the identification of true turning movement clusters with respect to minimizing the identification of outliers.

In various embodiments, the output of the clustering and optimization of step 404 is provided for a junction classification process 406. Specifically, in various embodiments, junction classification process 406 is implemented via one or more processors (such as one or more processors 54, 38 of FIG. 1) using the telemetry data, by examining common behavior of different vehicles over time in the same geographic location (e.g., similar turning and/or other movement, and so on). In certain embodiments, the network topology 350 (e.g., previously known maps of the road network) are also utilized for the classification process 406.

As illustrated in FIG. 4, in various embodiments the processor(s) utilize the junction classification process, by examining the patterns of turning movements of different vehicles over time (and in certain embodiments, other vehicle actions such as ignition cycles including ignition on and ignition off as determined by vehicle ignition sensors, and/or vehicle speed and/or other vehicle parameters) and clustering thereof (and, in certain embodiments the network topology 350) in categorizing the junctions into one or more of a number of different potential junction categories. Specifically, in various embodiments, the junction categories include the following: intersections 408, residential driveways 410, U-turns 412, parking lots 414, business driveways 416, curved roads 418, and large intersections 420. In certain embodiments, the large intersections 420 may be further sub-classified as (a) identified intersections 422 (e.g., intersections that were previously known from the network topology 350); and (b) new intersections 424 (e.g., intersections that were not previously known from the network topology 350).

Figure 9:
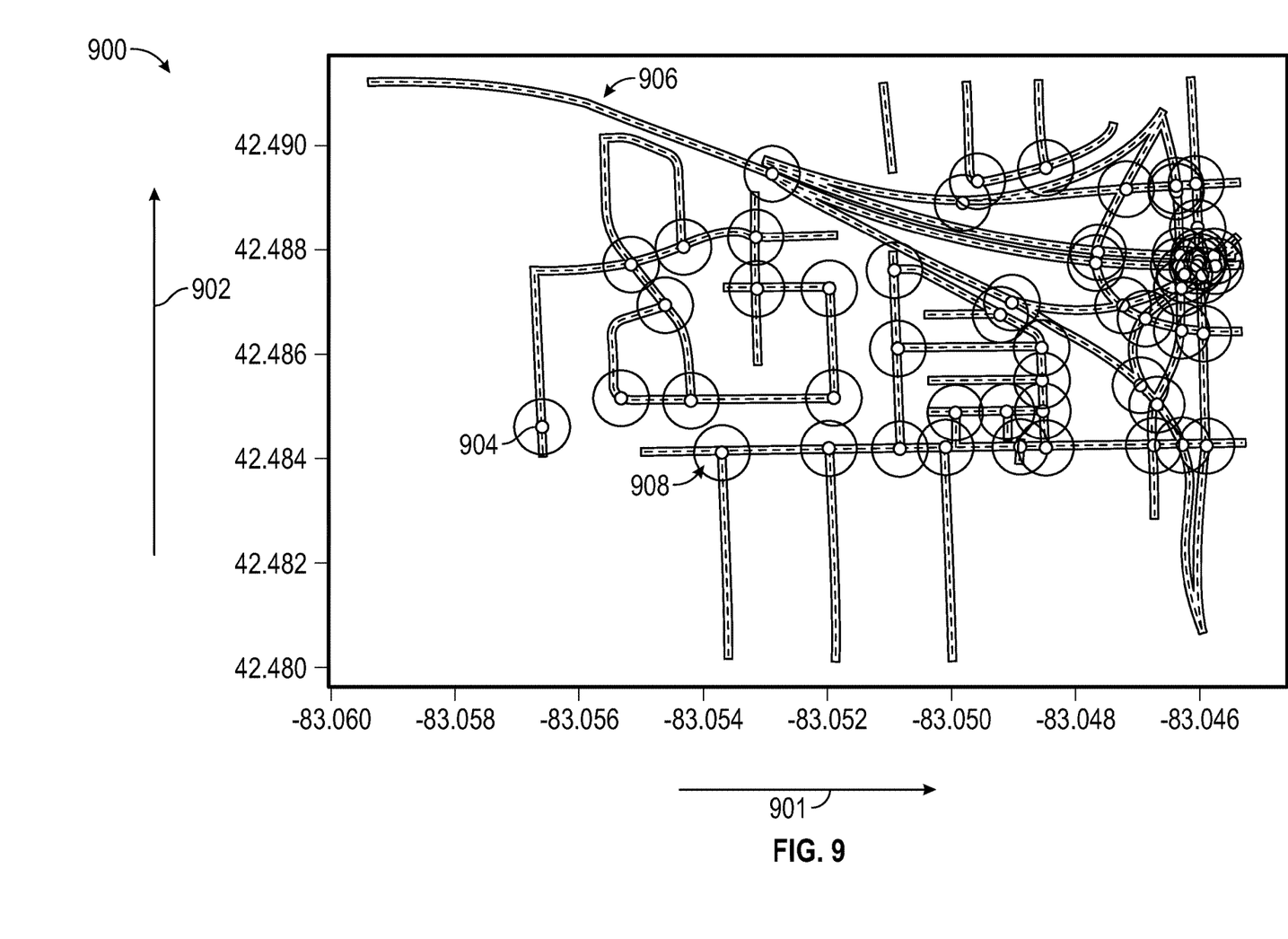
Figure 10:
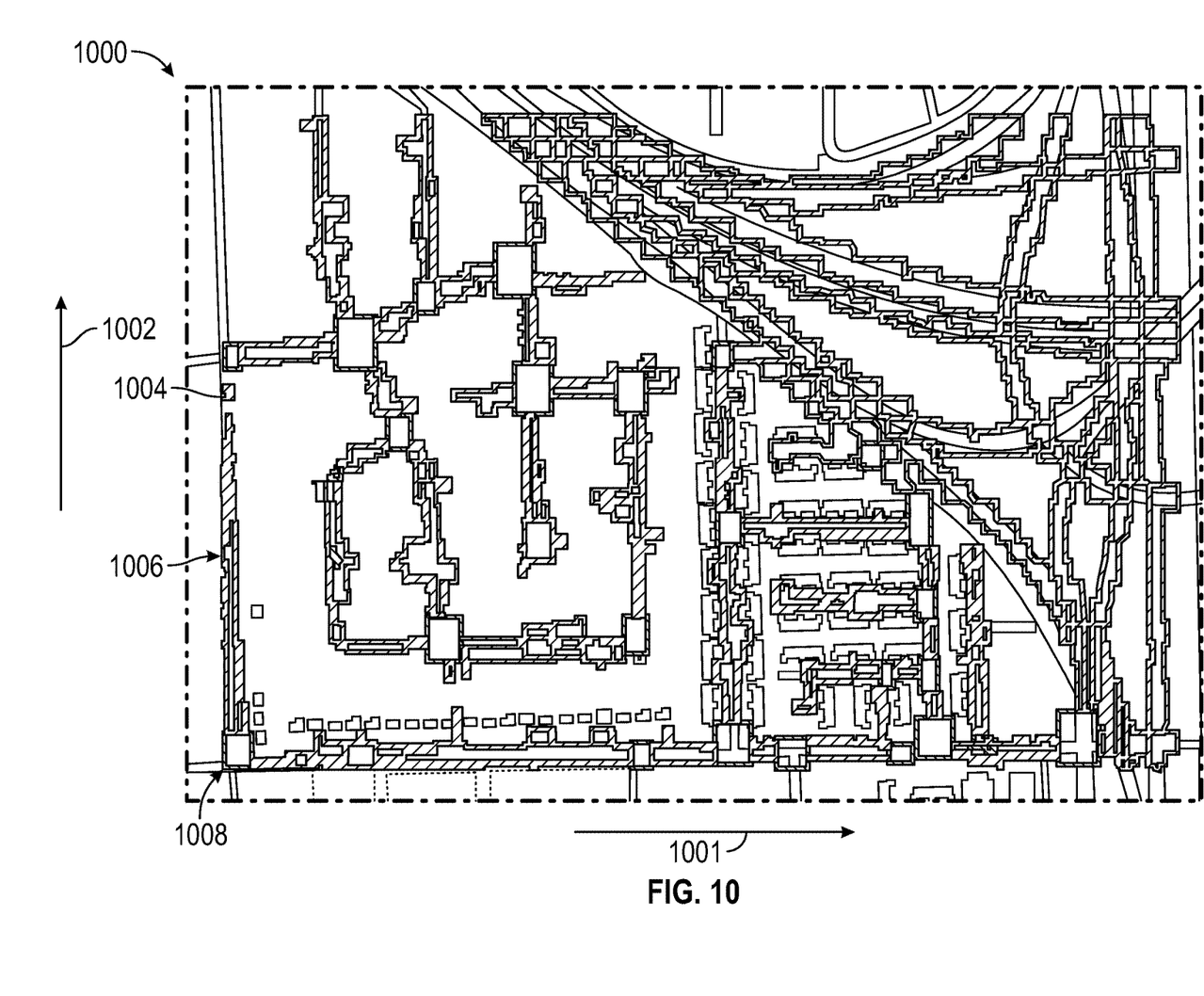

For example, with reference to FIGS. 8-10, in various embodiments the telemetry points 804 may be clustered together to represent road segments 806 and junctions (e.g., intersections) 808 as shown in FIG. 8. In addition, in certain embodiments, prior network topology 350 may be utilized for example as shown in the graphical representation 900 of FIG. 9. As depicted in FIG. 9, an x-axis 901 represents latitude, a y-axis 902 represents longitude, and previously known data points 904, segments 906, and junction (e.g., intersections) 908 are known from the network topology. Further, as depicted in FIG. 10, the graphical representation 1000 includes a combining of the data of FIGS. 8 and 9, with a similar x-axis 1001 representing latitude 1001 and a y-axis representing longitude 1002, and with a similar representation of data points 1004, road segments 1006, and junctions (e.g., intersections) 1008.

With reference back to FIG. 3, after the junctions are classified in step 312, in various embodiments the clusters are refined (step 314). Specifically, in various embodiments, one or more processors (such as one or more processors 54, 38 of FIG. 1) refine cluster memberships, for example by breaking up turning movement clusters into appropriate classes, such as the identification of intersections, residential driveways, parking lots, and others as in steps 410 through 418. In various embodiments, this also includes breaking up clusters identified as large intersections which may be a conglomeration into individual intersections as in step 420. Additionally, in various embodiments, a manifold is drawn around clusters and fine geohashes within that manifold are assigned to the cluster to remove holes (step 316). In certain embodiments, the manifold is drawn in a rectangle whose size is based on a predetermined area of influence for intersections and junctions.

Also in various embodiments, fine geohashes are assigned to the specific clusters (step 318). Specifically, in certain embodiments, spanning and enclosed geohashes from known geohash encoding data are assigned to each particular junction or type of junction by one or more processors (such as one or more processors 54, 38 of FIG. 1). Also in various embodiments, the junctions are labelled (step 320). Specifically, in various embodiments, the junctions are labelled by the processor(s) as to a finest possible geohash resolution encoding of a geometric center for the geographic region at issue. In various embodiments, a new cluster is selected (step 322), and the process returns to step 310, with steps 310-322 repeating for each cluster until each of the clusters are completed.

With reference back to FIG. 2, in various embodiments segments are identified (step 214). In various embodiments, the segments of the road network are identified by one or more processors (such as one or more processors 54, 38 of FIG. 1) based on the telemetry data of step 210 and are encoded with respective geohash data.

Figure 5:
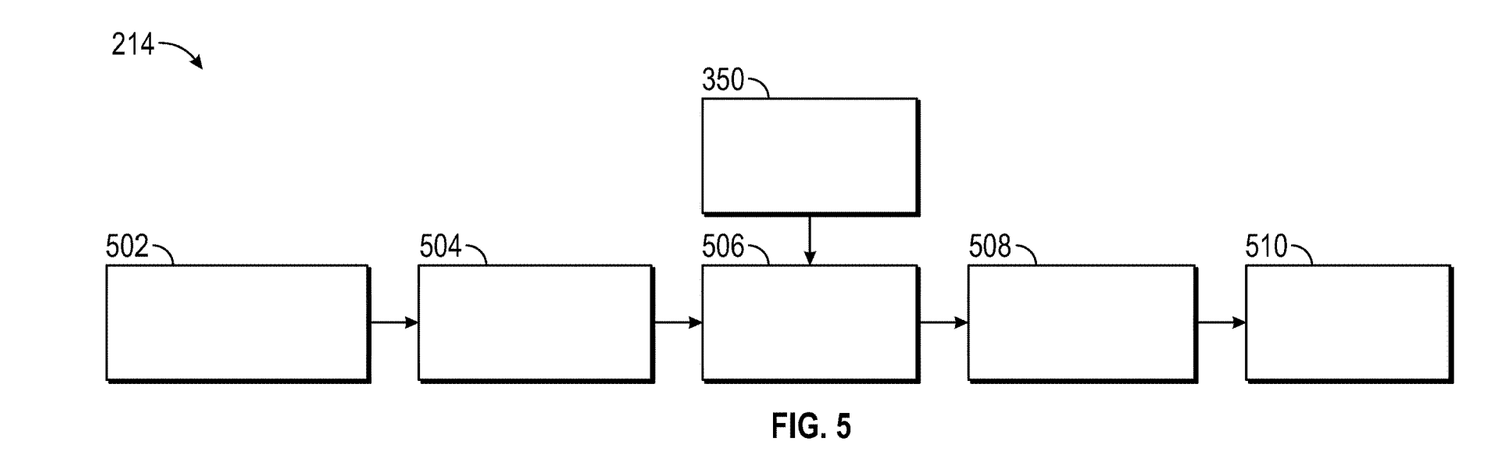
FIG. 5 is a flowchart for a step of the process of FIG. 2, namely, identifying segments of the road networks, in accordance with exemplary embodiments.

With reference to FIG. 5, an illustrative flowchart is provided for the step of identifying the segments in step 214 of FIG. 2. As shown in FIG. 5, in various embodiments, the intersection geohashes are removed from the road network analysis (step 502). For example, in certain embodiments, the junctions 808 and 1008 of FIGS. 8 and 10, respectively, are removed from the respective graphical representations 800, 1000 for the purposes of identifying the road segments 806, 1006 by the processor(s).

Also in various embodiments, the remaining geohashes (after removal of the intersections) are clustered into segments (step 504) by the processor(s). In various embodiments, the processor(s) further merge resulting segment fragments together (step 506) based on geographic proximity, and in certain embodiments also using the prior know network topology 350 for the merging of the segment fragments. In addition, in certain embodiments, the processor(s) further spilt any disconnected segments apart (step 508), for example to split apart segments that are not adjacent and/or physically/geographically connected to one another. Also in various embodiments, the processor(s) add direction to each geohash (step 510), for example by utilizing the patterns of direction of movement of different vehicles over time in the same geographic region.

With reference back to FIG. 2, in various embodiments adjacency is determined (step 216). In various embodiments, adjacency of the segments of the road network are determined by one or more processors (such as one or more processors 54, 38 of FIG. 1) based on the telemetry data of step 210 and the segments identified in step 214 and are encoded with respective geohash data.

Figure 6:
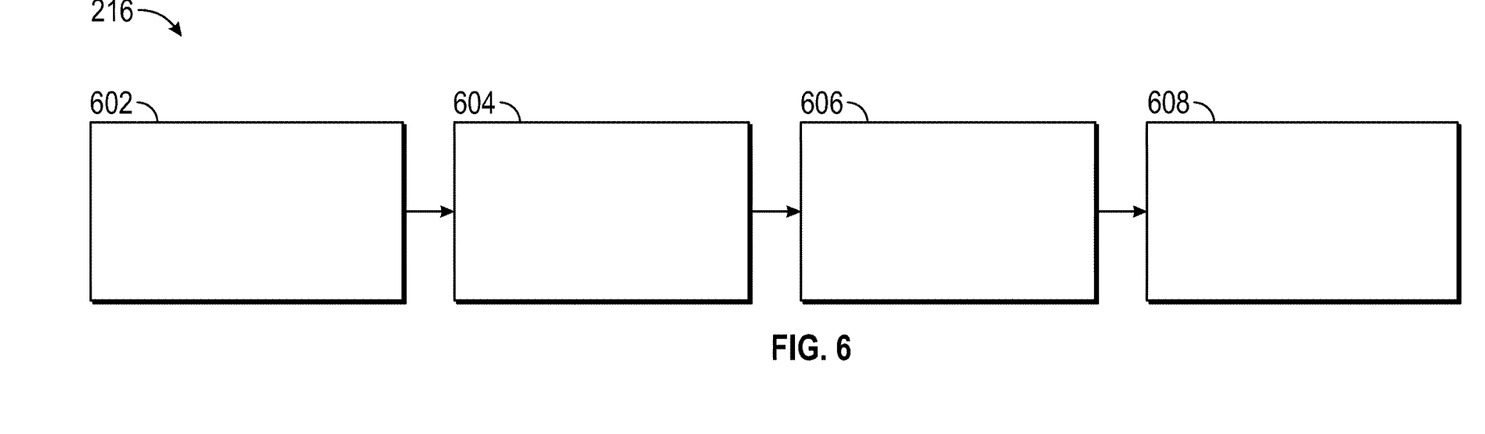
FIG. 6 is a flowchart for a step of the process of FIG. 2, namely, determining adjacency of components of the road networks, in accordance with exemplary embodiments.

With reference to FIG. 6, an illustrative flowchart is provided for the step of determining the adjacency in step 216 of FIG. 2. As shown in FIG. 6, in various embodiments, boundary geohashes are obtained (step 602). For example, in certain embodiments, the processor(s) identify boundary geohashes for each segment and junction identified in steps 212 and 214, above. Also in various embodiments, for each boundary of each and, a list of neighboring geohashes is obtained by the processor(s) (step 604). In various embodiments, the processor(s) further utilize a self-join function on the band table where the neighboring geohashes are equal to the boundary geohashes (step 606), for each to illuminate the boundary regions. Further, in various embodiments, the processor(s) filter the results (step 608), such that the junctions are adjacent to segments or junctions, but such that segments are not adjacent to segments.

With reference back to FIG. 2, in various embodiments, the next coarse geohash is selected (step 218). In various embodiments, the processor(s) identifies the next or subsequent coarse geohash to be examined, the process returns to steps 208-218 are repeated for each coarse geohash, until the analysis of all of the coarse geohashes is completed.

In various embodiments, once steps 208-218 are competed for each geohash, then stitching is performed (step 220). In various embodiments, the processor(s) perform stitching across each of the adjoining geohashes for the road network.

Figure 7:
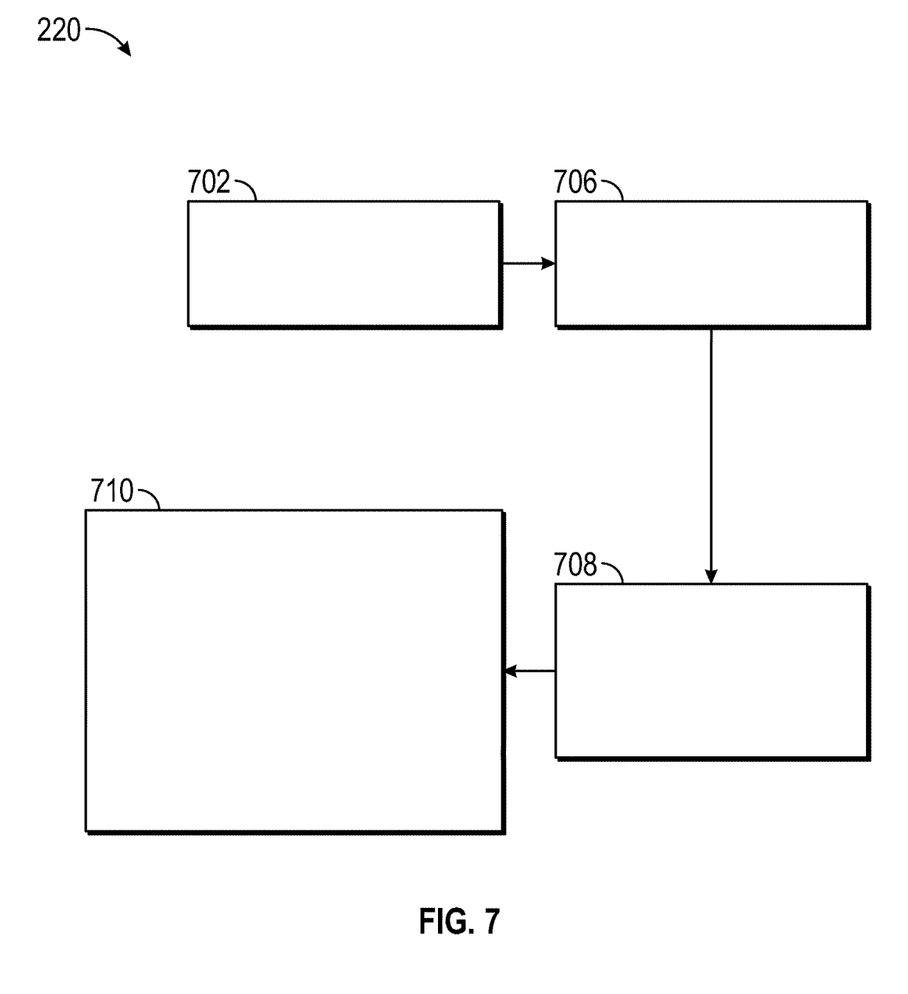
FIG. 7 is a flowchart for a step of the process of FIG. 2, namely, stitching across adjoining coarse geohashes, in accordance with exemplary embodiments.

With reference to FIG. 7, an illustrative flowchart is provided for the step of stitching the adjoining geohashes in step 220 of FIG. 2. As shown in FIG. 7, in various embodiments, road networks are identified independently over geohash regions of a first resolution (step 702). In one embodiments, the processor(s) identify road networks over a geohash region at the coarse geohash resolution. Also in various embodiments, the processor(s) identify a boundary for each of the coarse geohash regions (step 706). In addition, in certain embodiments, the processor(s) identify bordering geohashes at the fine geohash resolution in adjacent coarse geohash areas (step 708). Further, in certain embodiments, the processor(s) update the adjacency (step 710). Specifically, in certain embodiments, the processor(s) update the adjacency as follows: (i) by creating implicit junctions for segment-segment adjacency; (ii) by updating junction types and junction-junction adjacency; and (iii) by updating adjacency for segment junction adjacency. In various embodiments, the processor(s) also update the prior network topology 350 with respect to road segments, road junctions, or both, that are identified in the road network mapping in accordance with the process 200 and that are either (i) not present in the prior network topology 350 and/or (ii) are different than those presented in the prior network topology 350.

With reference back to FIG. 2, in various embodiments, the process then terminates (step 222).

Accordingly, methods and systems are provided for generated a road network. In various embodiments, a road network is generated using vehicle telemetry data (e.g., Telemetry data) from a plurality of vehicles (e.g., in a fleet) that is transformed into a geohash encoding for specific geographic regions of interest over which the vehicles are travelling. In certain embodiments, prior network topology may also be utilized in connection with the telemetry data and geohash encoding data, and in certain embodiments the network topology may further be updated based on the road network that is generated based on the vehicle telemetry data and the geohash encoding data.

It will be appreciated that the systems and methods may vary from those depicted in the Figures and described herein. For example, the communications system of FIG. 1, including the vehicle thereof, the telematics unit, and the control system thereof, and the remote server, servers, processors, and components thereof, may vary from that depicted in FIG. 1 and/or described herein, in various embodiments. It will similarly be appreciated that the process (and/or subprocesses) disclosed herein may differ from those described herein and/or depicted in FIGS. 2-10, and/or that steps thereof may be performed simultaneously and/or in a different order as described herein and/or depicted in FIGS. 2-10, and/or may be implemented differently than described herein and/or depicted in FIGS. 2-10, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   obtaining, via telematics systems of a plurality of vehicles, vehicle telemetry data as the plurality of vehicles travel through one or more geographic regions, including a vehicle position, a vehicle heading, and a vehicle speed for each of the plurality of vehicles;
   transforming, from a computer processor, the vehicle telemetry data into a geohash encoded format pertaining to the one or more geographic regions;

identifying, via the processor, pairs of sequential telemetry data points of the vehicle telemetry data in which a change in heading is greater than a predetermined threshold, indicating a vehicle turn;

determining, via the processor, cornering points for each pair of sequential telemetry points based on a linear interpolation between the sequential telemetry points of the pair;

examining common behavior of different vehicles over time over the same geographic location, to generate road segments and junctions;

refining cluster membership by drawing a manifold in a geometric shape around clusters from the clustering, the geometric shape comprising four or more sides;

identifying, via a processor, a plurality of road junctions using the vehicle telemetry data that is transformed into a geohashed encoding using the cornering points, based on a clustering of the cornering points of the plurality of vehicles over a plurality of periods of time as the plurality of vehicles travel through the one or more geographic regions;

identifying, via the processor, a plurality of road segments using the vehicle telemetry data that is transformed into a geohashed encoding for the one or more geographic regions, using the cornering points, based on a clustering of the cornering points of the plurality of vehicles over a plurality of periods of time as the plurality of vehicles travel through the one or more geographic regions, wherein the identifying of the plurality of road segments is performed by the processor by:
removing geohashes for the plurality of road junctions;
clustering remaining geohashes into segment fragments;
merging segment fragments together based on geographic proximity;
splitting apart disconnected segment fragments that are not physically or geographically connected to one another; and
adding directions to each respective geohash;

identifying a boundary for each of a plurality of geohash regions;

filtering results of the removing, clustering, merging, splitting, and adding, such that the junctions are adjacent to segments or junctions, but such that segments are not adjacent to segments, and further utilizing a self-join function on a band table in which neighboring geohashes of respective geographic regions are equal to boundary geohashes for corresponding boundaries of the respective geohash regions; and generating, via the processor, a road network mapping for the one or more geographic regions that includes the plurality of road junctions and the plurality of road segments utilizing the vehicle telemetry data that is transformed into a geohashed encoding, including based on the filtering.

2. The method of claim 1, further comprising:
classifying the plurality of road junctions, via the processor, based on the clustering of the cornering points, into the following classifications of road junctions: intersections, residential driveways, U-turns, parking lot, business driveways, and junctions.

3. The method of claim 1, further comprising:
stitching, via the processor, respective road network mappings for a plurality of the one or more geographic regions, based on identified boundaries and adjacencies for the respective road mappings, thereby generating the road network mapping for the plurality of the one or more geographic regions.

4. The method of claim 3, wherein the stitching is further performed via the processor by independently identifying road networks over a coarse geohash resolution; identify bordering geohashes at a fine geohash resolution in adjacent coarse geohash areas; and updating the adjacencies by:
creating implicit junctions for segment-segment adjacency;
updating junction types and junction-junction adjacency; and
updating adjacency for segment-junction adjacency.

5. The method of claim 1, further comprising:
obtaining, from the computer memory, a prior network topology for the one or more geographic regions;
wherein the step of generating the road network mapping comprises generating, via the processor, the road network mapping for the one or more geographic regions that includes the plurality of road junctions and the plurality of road segments, utilizing the vehicle telemetry data that is transformed into a geohashed encoding, and the prior network topology; and wherein the method further comprises:
updating the prior network topology, via the processor, via one or more road segments, road junctions, or both that are identified in the road network mapping in a manner that is different from prior network topology.

6. The method of claim 1, further comprising:
defining, via the processor, geohash resolutions with respect to the one or more geographic regions of interest, wherein the defining of the geohash resolutions includes defining, via the processor, both a coarse resolution and a fine resolution, wherein the coarse resolution provides decomposing of the road network mapping into a parallelizable process, and wherein the fine resolution provides discrete units that are used to describe road segments and junctions in the road network mapping.

7. The method of claim 1, wherein the manifold is drawn in a rectangle whose size is based on a predetermined area of influence for intersections and junctions.

8. The method of claim 1, further comprising:
assigning, via the processor, fine geohashes within the manifold to the clusters; and
labelling, via the processor, the junctions based on a finest possible geohash resolution encoding of a geometric center of a geographic region associated with the geometric shape.

9. A system comprising:
telematics systems from a plurality of vehicles; and
a processor that is configured to at least facilitate:
obtaining, from telematics systems of the plurality of vehicles, vehicle telemetry data as the plurality of vehicles travel through one or more geographic regions, including a vehicle position, a vehicle heading, and a vehicle speed for each of the plurality of vehicles;
transforming the vehicle telemetry into a geohashed encoding;
identifying pairs of sequential telemetry data points of the vehicle telemetry data in which a change in heading is greater than a predetermined threshold, indicating a vehicle turn;
determining cornering points for each pair of sequential telemetry points based on a linear interpolation between the sequential telemetry points of the pair;

examining common behavior of different vehicles over time over the same geographic location, to generate road segments and junctions;

refining cluster membership by drawing a manifold in a geometric shape around clusters from the clustering, the geometric shape comprising four or more sides;

identifying a plurality of road junctions using the vehicle telemetry data that has been transformed into a geohashed encoding for the one or more geographic regions using the cornering points, based on a clustering of the cornering points of the plurality of vehicles over a plurality of periods of time as the plurality of vehicles travel through the one or more geographic regions;

identifying a plurality of road segments using the vehicle telemetry data that has been transformed into a geohashed encoding for the one or more geographic regions using the cornering points, based on a clustering of the cornering points of the plurality of vehicles over a plurality of periods of time as the plurality of vehicles travel through the one or more geographic regions, wherein the processor performs the identifying of the plurality of road segments by:

removing geohashes for the plurality of road junctions;

clustering remaining geohashes into segment fragments;

merging segment fragments together based on geographic proximity;

splitting apart disconnected segment fragments that are not physically or geographically connected to one another; and adding directions to each respective geohash;

identifying a boundary for each of a plurality of geohash regions;

filtering results of the removing, clustering, merging, splitting, and adding, such that the junctions are adjacent to segments or junctions, but such that segments are not adjacent to segments, and further utilizing a self-join function on a band table in which neighboring geohashes of respective geographic regions are equal to boundary geohashes for corresponding boundaries of the respective geohash regions; and generating a road network mapping for the one or more geographic regions that includes the plurality of road junctions and the plurality of road segments utilizing the vehicle telemetry data that has been transformed into a geohashed encoding, including based on the filtering.

10. The system of claim 9, wherein the processor is configured to at least facilitate:

classifying the plurality of road junctions, based on the clustering of turning movements into the following classifications of road junctions: intersections, residential driveways, U-turns, parking lot, business driveways, and curved junctions.

11. The system of claim 9, wherein the processor is configured to at least facilitate:

stitching respective road network mappings for a plurality of the one or more geographic regions, based on identified boundaries and adjacencies for the respective road network mappings, thereby generating the road network mapping for the plurality of the one or more geographic regions.

12. The system of claim 9, wherein the processor is configured to at least facilitate:

obtaining, from the non-transitory computer readable storage medium, a prior network topology for the one or more geographic regions;

generating the road network mapping for the one or more geographic regions that includes the plurality of road junctions and the plurality of road segments, utilizing the vehicle telemetry data that has been transformed into a geohashed encoding, and the prior network topology; and updating the prior network topology via one or more road segments, road junctions, or both that are identified in the road network mapping in a manner that is different from prior network topology.

13. The system of claim 9, wherein the manifold is drawn in a rectangle whose size is based on a predetermined area of influence for intersections and junctions.

14. A system comprising:

a plurality of vehicles, each of the plurality of vehicles having respective telematics systems; and a remote server that is communicatively coupled to the plurality of vehicles, the remote server comprising a processor that is coupled to the telematics systems of the plurality of vehicles, and that is configured to at least facilitate:

obtaining, from telematics systems of the plurality of vehicles, vehicle telemetry data as the plurality of vehicles travel through the one or more geographic regions, including a vehicle position, a vehicle heading, and a vehicle speed for each of the plurality of vehicles;

transforming, from the computer processor, the vehicle telemetry data into a geohash encoded format pertaining to the one or more geographic regions;

identifying pairs of sequential telemetry data points of the vehicle telemetry data in which a change in heading is greater than a predetermined threshold, indicating a vehicle turn;

determining cornering points for each pair of sequential telemetry points based on a linear interpolation between the sequential telemetry points of the pair;

examining common behavior of different vehicles over time over the same geographic location, to generate road segments and junctions;

refining cluster membership by drawing a manifold in a geometric shape around clusters from the clustering, the geometric shape comprising four or more sides;

identifying a plurality of road junctions using the vehicle telemetry data that has been transformed into a geohashed encoding for the one or more geographic regions using the cornering points, based on a clustering of the cornering points of the plurality of vehicles over a plurality of periods of time as the plurality of vehicles travel through the one or more geographic regions;

identifying a plurality of road segments using the vehicle telemetry data that has been transformed into a geohashed encoding for the one or more geographic regions using the cornering points, based on a clustering of the cornering points of the plurality of vehicles over a plurality of periods of time as the plurality of vehicles travel through the one or more geographic regions, wherein the processor performs the identifying of the plurality of road segments by:

removing geohashes for the plurality of road junctions;

clustering remaining geohashes into segment fragments;

merging segment fragments together based on geographic proximity:

splitting apart disconnected segment fragments that are not physically or geographically connected to one another; and adding directions to each respective geohash;

identifying a boundary for each of a plurality of geohash regions;

filtering results of the removing, clustering, merging, splitting, and adding, such that the junctions are adjacent to segments or junctions, but such that segments are not adjacent to segments, and further utilizing a self-join function on a band table in which neighboring geohashes of respective geographic regions are equal to boundary geohashes for corresponding boundaries of the respective geohash regions; and generating a road network mapping for the one or more geographic regions that includes the plurality of road junctions and the plurality of road segments utilizing the vehicle telemetry data that has been transformed into a geohashed encoding, including based on the filtering.

15. The system of claim 14, wherein the manifold is drawn in a rectangle whose size is based on a predetermined area of influence for intersections and junctions.

* * * * *